United States Patent [19]

Cologna et al.

[11] Patent Number: 4,588,626
[45] Date of Patent: May 13, 1986

[54] BLIND-SIDE PANEL REPAIR PATCH

[75] Inventors: Rudy L. Cologna, Bellevue; Melvin D. Eng, Seattle; Edgar P. King, Kent, all of Wash.

[73] Assignee: The Boeing Company, Seattle, Wash.

[21] Appl. No.: 665,810

[22] Filed: Oct. 29, 1984

[51] Int. Cl.<sup>4</sup> .................... B32B 3/10; E04G 23/02
[52] U.S. Cl. ........................... 428/63; 52/514; 156/94
[58] Field of Search ............... 428/63, 65; 52/514; 156/98, 94

[56] References Cited

U.S. PATENT DOCUMENTS

| | | | |
|---|---|---|---|
| 2,598,194 | 5/1952 | Shippey | 428/63 |
| 2,997,416 | 8/1961 | Helton | 428/63 |
| 3,295,285 | 1/1967 | Metz | 428/63 |
| 3,325,955 | 6/1967 | Haut | 428/63 |
| 4,100,712 | 7/1978 | Hyman | 52/514 |
| 4,285,183 | 8/1981 | Condit | 52/514 |
| 4,370,842 | 2/1983 | Martin et al. | 52/514 |
| 4,406,107 | 9/1983 | Schoonbeck | 52/514 |

Primary Examiner—John E. Kittle
Assistant Examiner—Thomas C. Saitta
Attorney, Agent, or Firm—J. Michael Neary

[57] ABSTRACT

A repair patch kit for repairing holes in panels of composite materials includes a bolt having a rigid washer of about the same diameter as the hole to be repaired. The rigid washer bears against a slit disc that is substantially larger than the hole. The slit disc can be twisted to open the slit, and the slit can be inserted over the edge of the hole. The disc can then be "threaded" or rotated through the hole by merely revolving the bolt around the hold periphery. On the blind-side of the panel, the disc slit closes and a full disc form is presented to the blind-side of the panel. A set of resin-impregnated fabric plies is pushed through the hole behind the slit disc on the bolt and is pressed against the marginal regions of the hold on the blind-side of the panel by the slit disc. The hole is packed full of resin-impregnated fill material or a plug cut from a similar panel, and a set of resin-impregnated repair plies is pressed over the fill material and against the near side of the panel around the marginal regions of the hole by a back-up plate on the bolt. The entire assembly is squeezed tight against the panel by a nut on the bolt and held in place while the resin cures, after which the nut and plate are removed and the bolt is cut off flush with the near side panel surface.

34 Claims, 10 Drawing Figures

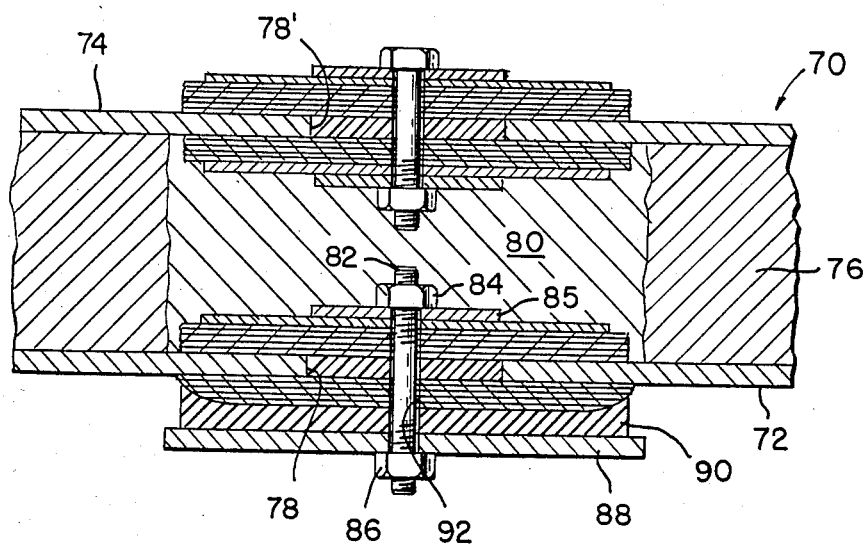
FIG. 8
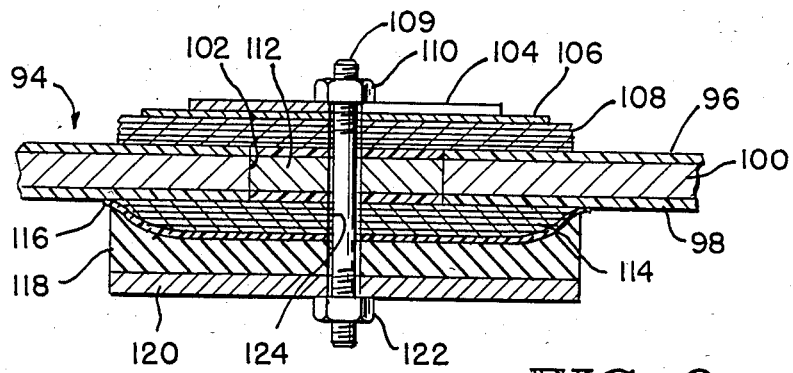
FIG. 9
FIG. 10
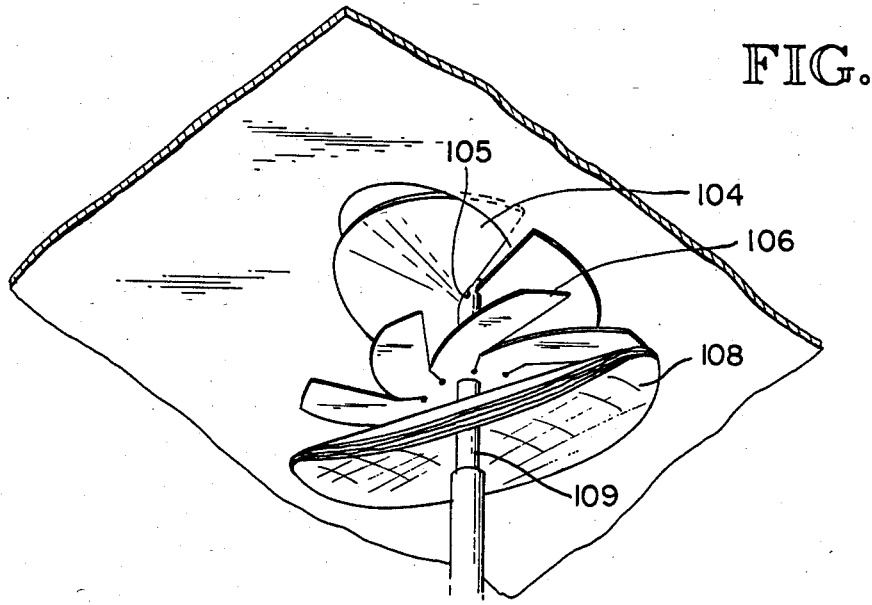

BLIND-SIDE PANEL REPAIR PATCH

BACKGROUND OF THE INVENTION

This application is related to Application Ser. No. 665,809 filed concurrently herewith.

This invention relates to repair patches for both sides of a panel, one side of which is inaccessible, and more particularly to reapir patches for such panels made of composite material.

There are a great many structures made with panels which are accessible only from one side. These include vehicles of all varieties, such as ground and water vehicles, aircraft and even space vehicles, and also include fixed structures such as buildings and storage tanks. When damage occurs to these panels, the damage must be repaired to restore the structural strength of the panel, restore its smoothness and appearance, and in the case of aerodynamic surfaces, reconfigure the surface to its original curvature or configuration, as close as possible to the original mold line. Repairing the accessible or near-side of the panel is seldom difficult but the panel cannot be restored to full strength if the inaccessible or blind-side of the panel is not repaired. Such blind-side repairs are difficult because of the limited access for positioning the patch material and applying pressure while it cures in place. A panel patched only on its near-side is weak on the blind-side because it is unable to transfer loads across the damaged section. When such a panel is subjected to a bending moment, it is subject to failure at loads much lower than the design capacity of the panel.

The problem is particularly troublesome with modern composite materials because of the higher load requirements for these materials and because of the necessity for producing flush repairs without the use of fasteners. Fasteners were permitted in prior art near-side patches but are undesirable for modern composite material patches. To accommodate the fasteners, additional holes must be drilled in the material, which creates additional weakness in th panel. Moreover, it is difficult to produce a patch that is flush with the original mold line of the panel and conforms exactly with its curvature when using a patch secured with fasteners. Finally, such fasteners exert a constant compression force on the repaired composite panel or honeycomb panel to hold the patch in place which could distort the cross section of the panel in the patch location and thereby reduce its load carrying capacity.

The installation of prior art patches in the vacinity of underlying spars and ribs within the member on the blind-side of the panel requires specially designed patches or connecting structure to the struts or ribs which could interfere with underlying mechanisms. On panels which form an aerodynamic surface, especially on high performance aircraft, the non-conformance to the original contour and loss of smoothness could produce a flutter of the control surface which could adversly affect aircraft performance and cause premature fatigue delaminating of the panel structure.

The few prior art patches for composite materials which provide for patch material on the blind-side require a series of steps, each requiring a separate cure time for the bonding agent in each of the steps. This prolongs the repair process and increases the number of steps involved in making the repair, thereby increasing the cost and increasing the down time of the equipment being repaired. In addition, it is an exacting process requiring special skills and care to produce an acceptable patch. Moreover, the prior art blind-side patches require complicated expensive and cumbersome equipment requiring special training of operators and subject to failure in operation which would interupt the capability of the facility to make those repairs.

Some other unsolved problems with prior art patches have been the inability to effect a permanent hermetic seal against leakage of pressurized fuel, air, water and other fluids and gases through the patch. Also, prior art patches are often thermally or chemically incompatible with the parent structure so that differential rates of thermal expansion cause loss of hermetic integrity of the patch or cause the panel to become distorted. Chemical incompatibility could cause loss of chemical resistance to certain chemicals such as hydraulic fluid which could cause the patch to swell and weaken. In addition, dissimilar metals and carbon/metal combinations can cause a harmful galvanic reaction that would weaken the patch.

SUMMARY OF THE INVENTION

Accordingly, it is an object of this invention to provide a blind-side patch which provides securely adhered load carrying materials on both the blind-side and the near-side of the panel to restore the panel to nearly its full original load carrying capability. It is another object of this invention to provide a patch which may be made nearly flush with the original near-side surface and conforms to the original curvature of the panel. It is yet a further object of the invention to provide structure and a method for applying pressure to the patch on the blind-side of the panel while the resin cures during patch formation without contacting or interferring with structure within or behind the panel, and which can cure at the same time that the resin in the near-side patch is curing. It is yet another object of the invention to provide a blind-side patch that is fast and simple to apply, is itself inexpensive and does not require expensive, cumbersome or complicated equipment, and which requires no special skills for its installation. It is an additional object of the invention to provide a blind-side patch specifically for composite material that hermatically seals the patch permanently and is compatible thermally and chemically with the original panel material.

These and other objects of the invention are attained in a blind-side patch, and method for making a blind-side repair of a panel, including a tension exerting member such as a bolt, with a head or a washer just slightly smaller than the hole in the panel, and a slit disc, over a stack of fabric plies impregnated with a bonding agent. The slit disc is twisted to open the slit wide enough to slip over the edge of the hole, and is then rotated through the hole. Pressure is transmitted from the bolt through the washer to the slit disc, to press the stack of impregnated plies against the blind-side of the panel in a broad marginal region around the hole. The hole in the panel is filled with a fill material, such as potting material or a plug from the original or similar panel, and the near-side of the panel is repaired with resin fabric plies impregnated with a bonding agent and compressed against the near-side of the panel by a backup plate and a nut on the proximal end of the bolt. After the bonding agent on the blind-side and near-side plies has cured, the nut and support plate are removed and the bolt is cut-off flush with the repaired surface of the panel.

DESCRIPTION OF THE DRAWINGS

The invention and its many attendant objects and advantages will become better understood by reference to the following detailed description of the preferred embodiment when read in conjunction with the following drawings, wherein:

FIG. 8 is a sectional elevation of the patch of this invention being used to repair a thick honeycomb core panel.

FIG. 9 is a sectional elevation of a thin honeycomb core panel being repaired with a patch of this invention.

FIG. 10 is an isometric view of the flexible disc of FIG. 6 being threaded into a hole in the panel of FIG. 9.

DESCRIPTION OF THE PREFERRED EMBODIMENT

Figure 1:
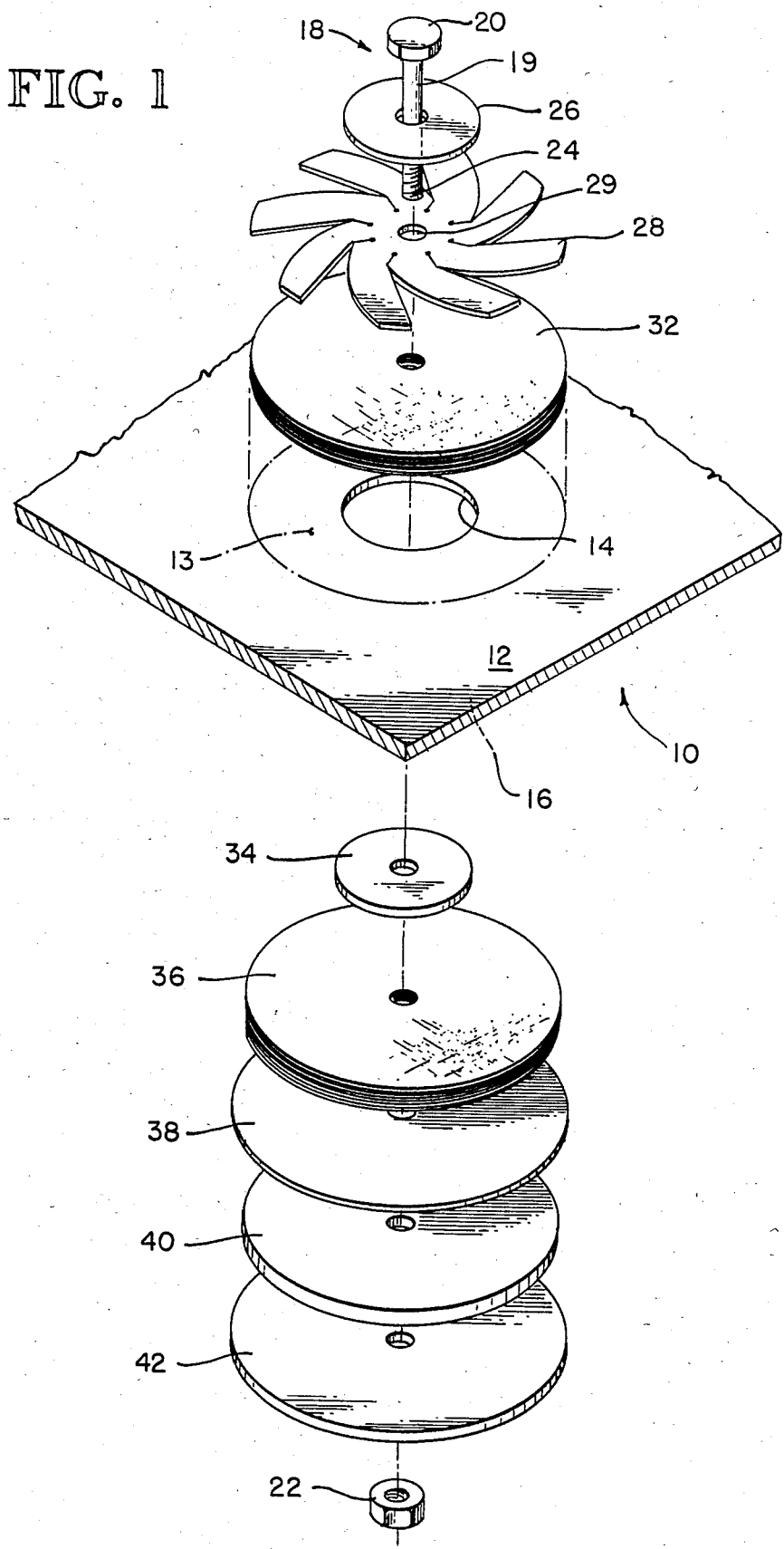
FIG. 1 is an exploded isometric view of a two sided panel patch made in accordance with this invention.

Turning now to the drawings, wherein like or primed reference numerals designate identical or corresponding parts, and more particularly to FIG. 1 thereof, a blind-side patch for a composite material panel 10 having a blind-side 12 to which access is restricted, or is limited to the marginal regions 13 around a circular opening or hole 14 in the panel. The panel also has a near-side 16 which is accessible to the repair personnel. The patch can be applied and used in any orientation, but the description herein will assume that the blind-side is "up" and the relational prepositions such as "above" and "under" will be used with reference to this orientation for description simplicity, but without restrictive effect.

The disclosed patch can be used on virtually any material to which a bonding agent, such as resins or exotic adhesives, will adhere or can be made to adhere. It is particularly useful for repairing holes in panels of conventional composite material made of layers of oriented fibers or fabric such as fiberglass impregnated with resin and cured to the desired shape, and was specifically designed and extremely effective for repairing holes in panels of modern composite materials including boron, Kevlar and graphite fabric impregnated with any one of a multitude of high strength and/or high temperature resins or bonding agents which can be cured by catalized or other reaction curing to form a strong rigid and lightweight structural panel.

The hole 14 in the panel 10 shown in FIG. 1 is formed by a hole cutting saw which removes the damaged section from the panel 10 and creates a circular hole of precise predetermined diameter, for example, 2.0 inches. The inside marginal regions 13 around the blind-side of the hole 14 are cleaned with sandpaper or chemical cleaner or primer. Because of the nature of composite material, any cracks in the material which were formed when the damage was done will not propagate through the material so that the hole cutting saw can remove the entire damaged section. The patch shown can be used to repair other materials such as aluminum, but it is desirable to cut out all of the damaged area including cracks which may have propagated from the damaged area before the patch is applied.

A tension member such as a bolt 18 having an elongated shank 19 and a head 20 is disposed coaxially in the hole 14 and serves to exert a compressive force on the elements of the patch while the patch resin cures. The bolt 18 is preferable made of non-metalic material such as nylon or Kevlar, although stainless steel is also a suitable material where high pressure is desired. Non-metalic material is desirable because it is easy to shear off flush with the exterior or near-side surface of the panel after the patch bonding agent has cured. A nut 22 threaded onto the proximal end 24 of the bolt shank 19 is tightened to exert tensile force on the bolt and thereby create the compressive pressure on the patch elements.

A centrally apertured solid washer 26 is disposed on the bolt 18 in contact with the head 20 on the distal end of the bolt 18. The solid washer 26 is circular in form and is appoximately the same diameter as the hole 14, but just slightly smaller in diameter than the hole 14 so that the washer can fit through the hole from the near-side 16 of the panel 12. The bolt shank may be integral with the washer 26 and thereby function as both washer 26 and bolt head 20, to obviate the need for a separate bolt head 20.

Figure 2:
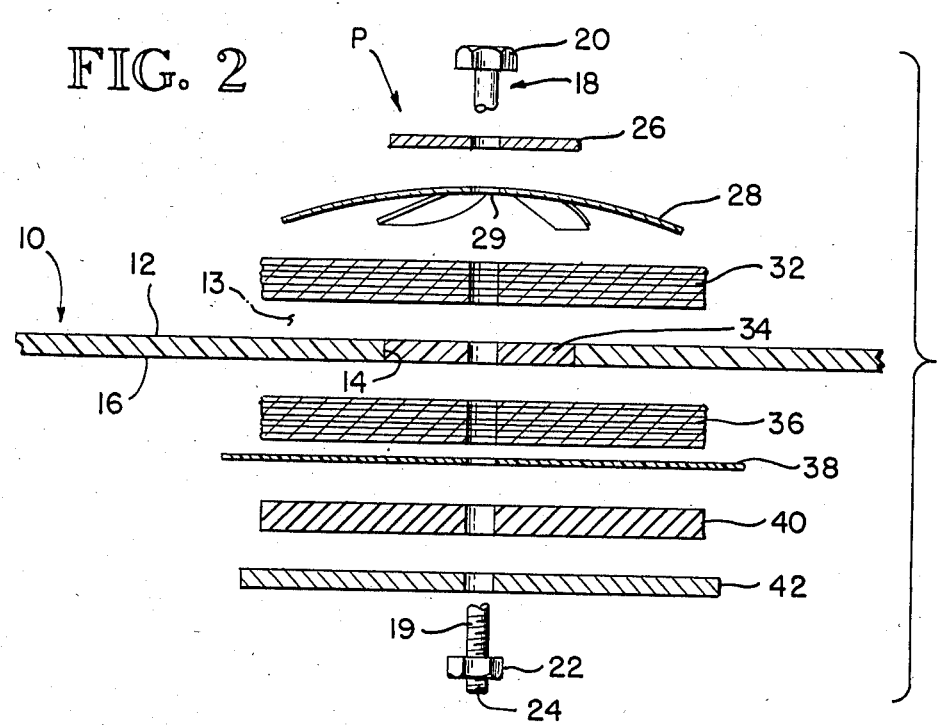
FIG. 2 is an exploded sectional elevation of the patch shown in FIG. 1.
Figure 5:
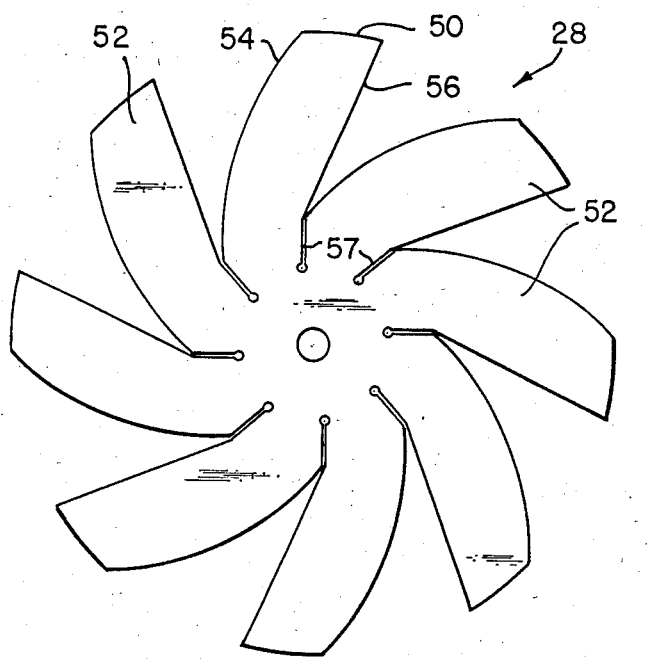
FIG. 5 is a plan view of a spiral fluke flexible washer used in the patch assembly of FIG. 1.
Figure 6:
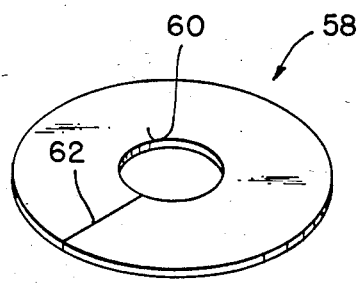
FIG. 6 is a isometric view of a flexible disc washer cut along one radius which can be used in the patchs of FIGS. 1, 3, 9 and 10.
Figure 7:
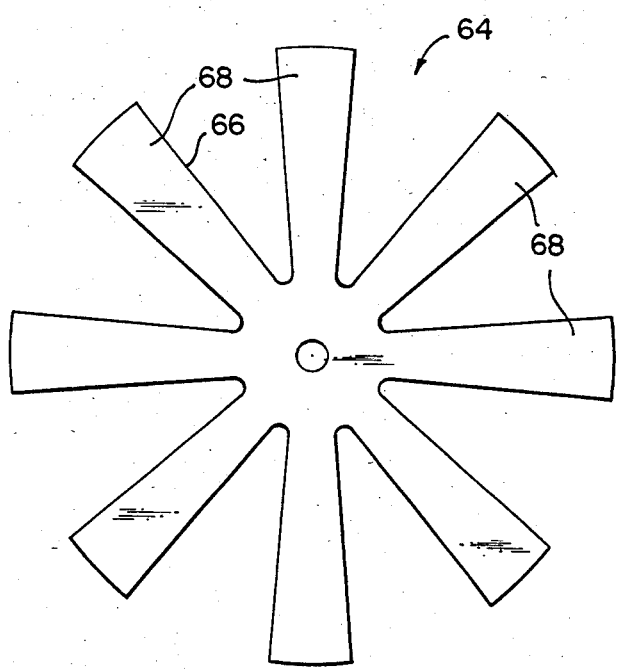
FIG. 7 is a plan view of a radial fluke flexible washer which can be used in the patch of FIGS. 1 and 3.

A flexible washer 28 having a central aperture 29 is disposed on the bolt 18 under the solid washer 26. The diameter of the flexible washer, as shown in FIG. 1 and even more clearly in FIG. 2, is substantially greater than the diameter of the hole 14 so that the washer covers the hole and overlaps the marginal regions 13 around the edge of the hole 14. The flexible washer 28 is made flexible so that it can be pushed through the hole 14 and it will flex as it is pushed through the hole, whereupon it will spring back to its original shape or to a fairly close approximation thereto. Any form or combination of flexible washers may be used in this application, provided that it/they are sufficiently stiff to exert the necessary pressure on the underlying repair material as described below. Some forms of flexible washers which have been specifically designed for this application are shown in FIGS. 5, 6 and 7 but other forms of washers will occur to those skilled in the art. The invention is not limited to the particular forms of washer disclosed herein, except as claimed.

A stack of fabric plies 32 is disposed on the bolt 18 underlying the flexible washer 28. Typically, on double-sided patches shown in FIGS. 1 and 2, the stack on each side will contain one more than one half the number of plies in the panel. The fabric plies 32 are impregnated with a bonding agent such as liquid resin which is selected for its strength, compatibility with and adhesion to the material of the panel 10 and the fabric plies 32. The liquid resin may be the same as was used in the original construction of the panel. It will typically be a room temperature cureable or heat cureable resin.

Figure 3:
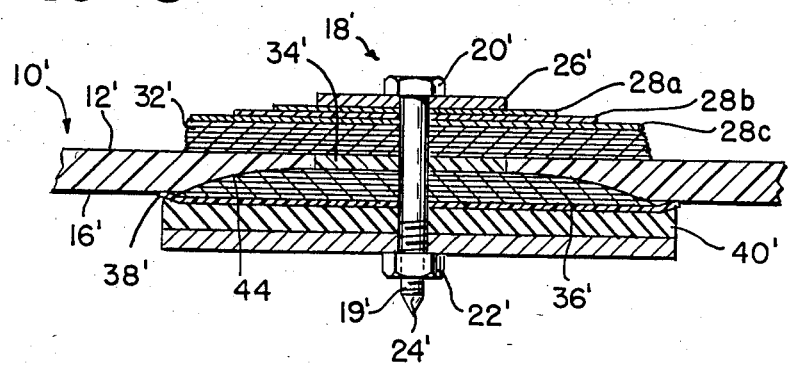
FIG. 3 is a sectional elevation of a modification of the patch shown in FIG. 2.

For maximum strength and load transfer capability across the hole 14, it is preferable that the fabric plies 32 not be punched with a hole to fit onto the bolt, but rather that the threads merely be pushed aside to allow the bolt to fit through the plies. One simple way of accomplishing this is to use a pointed, tapered instrument which can be pushed into the fabric and will push the fabric threads apart to allow passage onto the bolt 18 without cutting the threads. Another way, illustrated in FIG. 3, is to use a bolt with a proximal end tapering to a point. The point is inserted into the fabric and moved around to push the threads aside, without breaking them, to create a hole wide enough for the passage of the bolt without the threads catching on the bolt threads. The complete uncut threads then provide the optimal load path across the hole through the patch without creating abrupt thread ends within the patch material itself which could tend to act as stress risers.

A plug 34 of fill material is disposed in the hole 14, filling the hole completely. The plug 34 can be a wad of resin soaked fibers which can cure within the hole at the same time that the rest of the patch resin is curing, or it can be a circular plug cut from the same material from which the panel is made, using the same size hole cutter that is used to cut the hole 14. This will insure that the diameter of the plug 34 is the same as the hole 14 (discounting the thickness of the hole cutting saw), and ensures that the thickness of the plug 34 is the same as the thickness of the panel 10. It is typically unnecessary to soak a plug 34 that is cut from a panel which is similar to the panel 10 in resin because there is sufficient excess resin in the fabric plies 32 and 36 that is squeezed into the hole during patch formation so that no additional resin is necessary.

The patch assembly at this point in the repair process has the bolt 18 protruding from a single aperture in the plug 34, and the head 20 of the bolt 18 bearing against the solid washer 26, which in turn bears against the flexible washer 28, which in turn bears against the resin impregnated fabric plies 32 on the blind-side 12 of the panel 10. The solid washer 26, being about the same diameter as the hole 14, is unable to pull through the hole because of the stiffness and shear strength of the flexible washer 28. The flexible washer 28 exerts a substantially uniformed pressure over the entire surface of the fabric plies 32. As shown in FIG. 2, when a flexible washer 28 is pushed through the hole it will often be plastically deformed to a slightly concave configuration as shown which will militate for uniform exertion of pressure over the entire face of the fabric plies 32. However, it is desirable that excessive force not be exerted on the bolt 18 to preclude an upward dishing of the flexible washer 28 which could lessen the pressure exerted on the outer regions of the fabric plies 32 and thereby weaken the bond at that point.

A second set of resin impregnated fabric plies 36, identical to the first set 32, is slid onto the proximal end of the bolt 18 protruding through the hole in the plug 34. A release agent or film 38 and a disc 40 of compliant material such as rubber is slid onto the bolt. The release film 38 is selected to prevent adhesion of the disc 40 to the patch material for easy removal of the disc 40 after the resin has cured. The disc 40 is covered with a backup solid steel support plate 42, and the nut 22 is screwed onto the end of the bolt 18 and tightened to exert the required compressive force on the washer 26 and plate 42 and hence on the plies 32 and 36. The compressive pressure on the plies 32 and 36 uniformly distributes the resin throughout the fabric and squeezes excessive resin out of the material. More importantly, the pressure expresses the voids from the fabric plies. Such voids could tend to form stress risers and points of weakness within the patch. As mentioned earlier, the compressive force also squeezes the excess resin into the hole 14, filing the crack between the plug 34 and the sides of the hole 14 and providing a continuous body of material throughout the patch. The rubber disc 40 is squeezed by the support plate 42 against the fabric plies 36 (through the release film 38) and tends to smooth the patch material and form a smoothly tapered surface profile on the near-side 16 of the panel 10.

After the resin in the patch material has cured, the nut 22 is unscrewed from the proximal end 24 of the bolt 18, and the support plate 42, the rubber disc 40, and the release film 38 are slid off the bolt. The bolt is then cut off flush with the surface of the patch and, if desired, the patch may be buffed and finish coated to match the coating on the near-side 16 of the panel 10. The fabric plies 32 and 36 in the completed patch provide a strong load path across the hole 14 in both compressive and tensile stresses so that the bending moments exerted on the panel in either direction are borne with virtually the same load carrying capacity as the original panel.

To improve the adhesion of the patch material to the panel surfaces, it is sometimes desirable to provide yieldable plies immediately adjacent the surfaces of the panel. This allows the inner layers of the plies 32 and 36 to yield under high stress and transfer the load to the overlying plies rather than delaminate from the panel surfaces. This can be achieved by using lesser strength materials on the inside surfaces of the patch. One example is to use one or two plies of glass fabric adjacent the surfaces 12 and 16 of the panel 10 and two to five plies (depending on the panel thickness) of graphite fabric over the glass fabric plies. This enables the glass fabric plies to yield and transfer the stress to the graphite fabric rather than peel away from the surface of the panel 10. The laod carrying capacity in the patch is thereby increased.

When it is desired to retain exactly the original mold line configuration of the panel, the near-side of the panel in the marginal regions around the hole 14 may be scarfed to provide a tappered recess into which the near-side plies can lie within the original mold lines of the panel. A patch of this configuration is shown in FIG. 3 showing a scarf 44 cut into the near-side surface 16' of the panel 10'. The use of a scarf 44 in the surface of the panel 10' makes it desirable to use a stack of repair plies 36' which are of slightly increasing diameter from inside to outside, moving toward the proximal end 24' of the bolt 18'. The, scarf can be cut with a simple convex grinder or sanding disc with an edge depth gauge.

The patch shown in FIG. 3 also includes a plurality of flexible washers 28a, 28b and 28c. This allows a more uniform transfer of pressure from the bolt head 20' through the solid washer 26', through the flexible washers 28a–c to the radially outer regions of the fabric plies 32' without recourse to a flexible washer of excessive stiffness.

Figure 4:
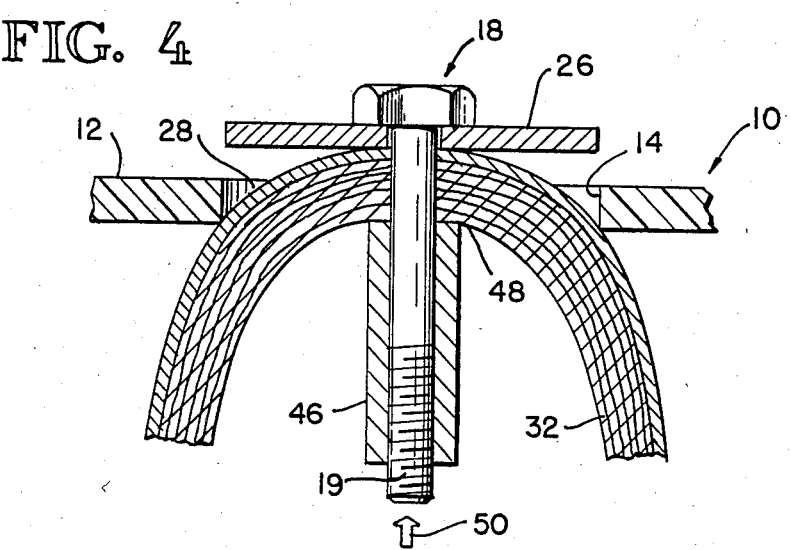
FIG. 4 is a sectional elevation of the blind-side portions of the patch shown in FIG. 1 being installed.

The method of installation of the patch shown in FIGS. 1 and 2 through the hole 14 in the panel 10 is shown in FIG. 4. The blind-side elements of the patch, namely the solid washer 26, the flexible washer 28 and the resin impregnated blind-side fabric plies 32 are inserted into the bolt 18, and a tool 46 is then inserted onto the bolt 18 with its distal end 48 abutting against the inner regions of the plies 32 around the bolt 18. The tool 46 is nothing more than a piece of pipe having an interior bore which closely fits around the bolt shank 19. Its purpose is to exert a pushing force on the inner regions of the fabric plies 32 and the flexible washer 28 to force the washer to bend, as shown in FIG. 4, and pass through the hole 14, and hold the bolt from being shot into the cavity behind the blind-side 12 of the panel 10 when the flexible washer 28 springs back from its flexed shape shown. After the blind-side elements of the patch are pushed through the hole 14, the tool 46 is removed for installation of the other patch elements.

Several flexible washers are shown in FIGS. 5, 6 and 7. The washer 28 shown in FIG. 5 has a circular outer periphery 50 and includes a plurality of eight flukes 52, each having a curved edge 54 and a straight edge 56. At the junction of the straight edge 56 and the curved edge 54 of the adjacent fluke 52, the flexible disc 28 is cut on a radial line 57 a distance sufficient to give the fluke 52 the required flexibility to pass through the hole 14 without excessive plastic deformation. The spiral shape of the fluke 52 produces an off-set force on the fluke as it is pushed into the hole 14 which gives it a slight twist as it bends, so that it presents its curved edge to the edge of the hole 14 to minimize the frictional resistance of the flexible washer as it passes through the hole.

Another form of flexible washer is the flexible disc 58, shown in FIG. 6, in the form of a flat or slightly domed washer having a central hole 60, and a cut or slit 62 running from the hole 60 out to the circumferential edge of the flexible washer 58 along one radius. The slot 62 enables the flexible washer 58 to be twisted slightly so that one edge can be threaded into the hole 14 as illustrated in FIG. 10, and then the entire washer 58 can be rotated into the hole even though the washer is of a greater diameter than the hole 14. Disc 58 distributes the compressive force exerted by the bolt head 20 over the radially outer portions of the fabric plies 32 as uniformly as possible when the nut 22 is tightened. The disc 58 may be made perfectly flat if it has sufficient stiffness to resist dishing up at its outer edges when tightened to exert the required pressure against the blind-side plies.

Yet a third form of flexible washer is shown in FIG. 7. This washer uses a flat disc 64 having rounded wedge shaped cutouts 66 evenly spaced around the disc to form between them a series of eight radially extending flukes 68 which are wider at their radially extremities than they are at the inner regions. To increase the stiffness at the inner regions of the flukes 68, so that the pressure is sufficient and uniform over the entire patch, the disc 64 can be made thicker at its center, tapering to thinner at its radial outer edges.

The flexible washers shown in FIGS. 5, 6 and 7 may be used together in the manner shown in FIG. 3. For example the washer of FIG. 6 can serve as the top washer 28a, the washer shown in FIG. 7 can be the second washer 28b or bottom washer 28c, and the washer shown in FIG. 7 can be the bottom washer 28c, or the second washer 28b. Other combinations and other washer configurations will occur to those skilled in the art in view of this disclosure.

Some composite material panels utilize and inner and outer skin of composite material and a honeycomb core between them. The repair of this type of panel has been particularly difficult in the prior art, but the use of this invention makes a quick and extremely strong repair of these panels. The process and structure of such a repair is illustrated in FIG. 8 in which the honeycomb panel 70 includes a near-side skin 72 and a blind-side skin 74, sandwiching between them a thick core 76 of honeycomb or syntactic foam. To accomplish the repair, a hole 78 is drilled in the near-side skin 72 with a hole saw similar to that used to drill the hole 14 in the panel 10, and the hole is continued straight through the panel to form a hole 78' of the same diameter in the blind-side skin 74. The honeycomb material in the region of the damage is removed to provide a cavity 80 to accommodate the repair materials. The blind-side skin 74 is then repaired in the same manner as that shown for the repair of the panel 10 in FIGS. 1 and 2, although the compliant disc 40 is not necessary since the lower surface of the patch on the the blind-side skin 74 is in the interior of the panel 70.

Without waiting for the resin in the blind-side panel patch to cure, the near-side skin 72 is also repaired in the same manner as that disclosed for the panel 10 in FIGS. 1 and 2, with the difference that, instead of using a bolt 18 with a head 20, a threaded rod 82 with a nut 84 on its distal end is used. The nut 84 could be fastened to the solid washer, or integral with it, so that it would not turn when the nut 86 is tightened against the support plate 88. A release material is coated on the threaded rod 82 so that the bonding agent in the patch material will not stick to the rod 82.

After the bonding agent in the patch material for the near-side skin repair patch has cured, the nut 86, support plate 88 and rubber disc 90 are removed. The threaded rod 82 is unscrewed from the nut 84, leaving an axial hole 92 through the center of the patch in the near-side skin 72. The hole 92 provides a convenient access for injecting a syntactic foam into the cavity 80 which cures in place to rigidify the panel in the region of the patch, in the same manner as the original honeycomb provided.

Some honeycomb panels are too thin to accomodate patch elements in their core. Such a panel 94, illustrated in FIG. 9, includes a blind-side skin 96 and a parallel, spaced near-side skin 98, sandwiching a honeycomb or syntactic foam core 100. A hole 102 is drilled with a conventional hole saw through both skins and the core of the panel. A cut or slit, flat, circular turn-in disc 104 having a center bolt hole and a straight radial slot from circumference to bolt hole, a flexible washer 106, and a stack of blind-side resin impregnated fabric plies 108 are slid onto a threaded rod 109 having a nut 110 on its distal end and coated with a release material like that used on the rod 82 in FIG. 8. The assembly is inserted through the hole 102 in the same manner as that illustrated in FIG. 4. The slit turn-in disc 104 and flexible washer 106 may also be used in the patch of FIGS. 1. and 2. Alternatively, a stack of slit discs 104 may be used, with their slits misaligned angularly and with a bonding agent applied between them when inserted through the hole 102 to the blind-side of the panel. The number of discs 104 may be adjusted to attain whatever stiffness is desired. The number of fabric plies 108 in the stack may be as few as one, but preferrably is equal to one more than is in the blind side skin. A thin panel will typically have two or three play skins, so each stack of repair plies for repair of such a panel will have three or four plies.

The diameter of the disc 104 can be as large as twice the diameter of the hole 102 in the panel, less the diameter of the threaded rod 109. However, for ease of insertion the disc 104 is made slightly smaller. Specifically, it has been found that the disc is very easily inserted if its diameter is made equal to twice the diameter of the hole 102 in the panel, less twice the diameter of the rod 109. The diameter of the center bolt hole 105 in the slit disc 104 is less than about one-eighth the diameter of the slit disc. It is desirable to raise the rod 109 sufficiently that the bolt head or nut 110 is clear of the panel, that is, it overlies the blind-side of the panel, so the disc can be revolved into the hole 102 using the rod 109 as a handle.

A core plug 112, preferably cut from a similar panel with the same size hole cutting saw that cut the hole 102, is fitted over the rod 109 and into the hole 102. A stack of repair plies 114 is slid onto the bolt and is covered by a release film 116. A compliant disc 118 covered by a rigid support plate 120 slides onto the bolt is secured by a nut 122. The nut 122 is torqued up tight against the support plate to produce sufficient pressure on the repair plies 108 and 114 to squeeze the excess resin out of the plies and into the core plug 102, and to express all voids out of the plies 108 and 114.

After the resin has cured, the removable rod 109 may be unscrewed from the threaded hole 124 created by the resin curing around the rod 124. The hole 124 provides an inspection port for insertion of the probe of a fiber optic inspection instrument. This allows inspection of the interior structure behind the panel without weakening the panel. The hole 109 can then be replugged and sealed with non-permanent sealant on the same threaded rod 109 by providing a screw driver slot in its proximal end and screwing it in flush with the outer surface of the patch. The patches of FIGS. 1 and 3 may also be made using a removable rod by replacing the headed bolts 18 and 18' with similar threaded rods 109 and nuts 110.

The slit disc turn-in disc 104 may be used without the fabric plies to provide a hermetically sealed back-up plate on the blind-side of a panel for panel repairs that do not require restoration of substantial strength, or for panels that are not load bearing. The repair is accomplished by inserting the disc 104, on its rod 109 and nut 110 with or without a back-up washer 26, through the panel hole 102, and applying a bonding agent such as resin to adhere the disc 104 to the marginal regions around the hole 102 on the panel blind-side, and also to seal the radial slit in the disc. The rod 109 is held in place with a nut 122 against a support plate 120 or suitable spider while the resin cures. Likewise, the flexible washers of FIGS. 5 and 7 with back-up washers 26 may be used in the same manner for the same purpose.

Obviously numerous modifications and variations of the patch structure and method disclosed above are possible and will occur to those skilled in the art in view of this disclosure. Therefore it is expressely to be understood that these modifications and variations, and the equivalents thereof, may be practiced while remaining within the spirit and scope of this invention as defined in the following claims, wherein

I claim:

1. A blind-side panel patch for repairing a damaged panel of composite material, wherein the damaged section has been cut out, leaving a circular hole of certain diameter, comprising:
    a circular disc having a central hole and a slit extending from the outer circumferential edge of said disc to said central hole, and having an outside diameter smaller than twice the diameter of said panel hole, and larger than the diameter of said panel hole;
    a bolt having a shank sized to fit through said hole in said disc;
    a plurality of fabric plies adapted to be impregnated with a bonding agent and inserted on said bolt adjacent said disc and, when said disc is twisted and one edge inserted into said panel hole and turned therethrough by revolving said bolt around the periphery of said panel hole, said fabric plies may be pushed through said panel hole and pressed by said disc against said blind-side of said panel on the marginal regions around said panel hole, and against a plug of material filling said hole;
    a plurality of fabric plies adapted to be impregnated with a bonding agent and impaled on said bolt against the near-side of said panel opposite to said blind-side;
    a rigid support plate having a central aperture sized to receive said bolt shank; and
    a nut for threading on said bolt shank and torquing against said support plate for squeezing said disc and said support plate against said plies to compress said plies against said panel to express the voids out of said fabric plies and hold said plies in place while said bonding agent cures.

2. The patch defined in claim 1, wherein the diameter of said disc is greater than one and one-half times the diameter of said panel hole and smaller than twice the diameter of said panel hole, less the diameter of said central hole, and wherein the diameter of said central hole is less than about one-eighth the diameter of said disc.

3. The patch defined in claim 2, wherein said disc diameter is about equal to twice the diameter of said panel hole, less twice the diameter of said central hole.

4. The patch defined in claim 1, further comprising a flexible washer for insertion on said bolt between said slit disc and said panel blind-side to militate for stiffness and sheer resistance, and thereby for exerting substantially uniform pressure against said blind-side plies.

5. The patch defined in claim 1, further comprising at least one addition slit disc between said circular slit disc and said panel blind-side for stiffness and uniformity of pressure against said blind-side plies.

6. The patch defined in claim 5, wherein said additional slit disc is oriented with the slit thereof angularly misaligned from the slit in said circular slit disc, and adhered thereto with said bonding agent to bond said discs together and stiffen the assembly of said discs.

7. The patch defined in claim 1, further comprising a release film between said support plate and said near-side repair plies to facilitate release of said support plate after said bonding agent has cured.

8. The patch defined in claim 1, further comprising a sheet of compliant material between said support plate and said near-side plies for smoothing and tapering said near-side plies while said bonding agent cures to produce a near-side patch that is smooth and conforms closely to the original mold line of said near-side panel surface.

9. The patch defined in claim 1, wherein said near-side plies are of increasing diameter from inside to outside to produce a tapered stack of plies which is adapted to conform to the configuration of a recess in said panel which is scarfed out on the near-side thereof in the marginal regions around said panel hole to provide a recess to receive said near-side plies, so said patch conforms closely to the original near-side panel mold line.

10. The panel patch defined in claim 1, further comprising:
    a rigid washer having a diameter just slightly smaller than said panel hole, to allow said rigid washer to pass through said hole with close clearance;

said bolt having a distal end with an enlarged head thereon, and a proximal end for engagement by a tension creating and exerting device;

said rigid washer having a center hole with a diameter smaller than the diameter of said enlarged head such that the underside of said enlarged head abuts the top side of said rigid washer, and tension in said tension member created by said tension creating device is converted to compressive stress in said rigid washer, and the compressive stress in said rigid washer is converted to shear stress in said slit disc and thence to compressive pressure against the structure underlying said slit disc.

11. A panel patch for repairing and substantially restoring the structural load carrying capacity of the blind-side of a damaged section of a panel from which the damaged portion has been cut out, leaving a smooth sided hole, comprising:

a tension member for exerting a squeezing force on said patch;

a slit disc having a diameter at least about 50% larger than the diameter of said hole, and a central aperture for receiving said tension member, and a slit extending from the outer periphery of said disc at least to said central aperture, said disc being adapted to be adhered and sealed to said panel blind-side on the marginal regions thereof around said hole to carry stress in said panel across said hole;

said slit disc being sufficiently flexible that one edge thereof adjacent said slit may be flexed out of the plane of said disc and inserted through said hole and over the blind-side of said panel on the marginal regions around said hole, and said disc may be turned through said hole from the near-side to the blind-side.

12. The panel patch defined in claim 11, wherein said slit disc may be turned through said panel hole from the near-side to the blind-side by revolving said tension member around the periphery of said panel hole, and further comprising at least one ply of fabric adapted to be impregnated with a bonding agent and inserted on said bolt to lie between said panel blind-side, on the marginal regions thereof around said panel hole, and be compressed by said slit disc against said panel to express voids from said near-side ply while said bonding agent cures.

13. The panel patch defined in claim 11, further comprising:

a rigid washer having a diameter just slightly smaller than said panel hole, to allow said rigid washer to pass through said hole with close clearance;

said tension member having a distal end with an enlarged head thereon, and a proximal end for engagement by a tension creating and exerting device;

said rigid washer having a center hole with a diameter smaller than the diameter of said enlarged head such that the underside of said enlarged head abuts the top side of said rigid washer, and tension in said tension member created by said tension creating device is converted to compressive stress in said rigid washer, and the compressive stress in said rigid washer is converted to shear stress in said slit disc and thence to compressive pressure against the structure underlying said slit disc.

14. The panel patch defined in claim 11, further comprising at least one ply of fabric adapted to be impregnated with adhesive and inserted on said tension member adjacent said disc, and about equal in diameter with said disc so that said fabric ply covers the marginal regions of said panel around said panel hole on said panel blind-side, and is urged thereagainst by said slit disc while said adhesive cures, adhering said disc and said fabric ply together and to the marginal regions around said hole on the blind-side of said panel.

15. The panel patch defined in claim 14, further comprising a support plate having a central aperture for receiving the proximal end of said tension member and covering said panel hole and the marginal regions therearound, said tension creating and exerting device adapted to bear against said support plate and apply pressure therewith against the near side of said panel.

16. A method for repairing the blind-side of a damaged section of a panel, comprising:

cutting a circular opening in said panel to remove said damaged section;

inserting a bolt through a central hole in a circular disc larger in diameter than said opening and smaller than twice the diameter of said opening; said circular disc having a slot from its outer peripheral edge to its central hole;

flexing said disc to separate the edges of said slot;

inserting one of said slot edges through said panel opening so that the radially outer portion of said disc is on said blind-side of said panel, and the radially outer portion of said disc on the other side of said slot is on said near-side of said panel;

revolving said bolt around said panel opening to turn said disc entirely through said opening;

pushing a plurality of fabric plies impregnated with a bonding agent through said opening;

filling said opening with a plug of core material;

laying a plurality of fabric plies impregnated with a bonding agent over the near-side of said panel on said plug and on the marginal regions of said panel around said opening;

fitting a centrally bored support plate onto said bolt; and threading a nut onto said bolt and torquing said nut against said support plate to squeeze said blind-side and said near-side plies between said disc and said support plate to squeeze excess bonding agent into said opening and to express voids from said fabric plies.

17. The method defined in claim 16, further comprising:

inserting a flexible washer between said disc and said blind-side fabric plies;

flexing said flexible washer, after said disc has been turned into said opening, by pushing said flexible washer axially through said opening; and pressing said flexible washer and said disc against said blind-side plies.

18. The method defined in claim 17 wherein said flexible washer is about the same diameter as said blind-side fabric plies.

19. The method defined in claim 16, wherein said plug of core material is a centrally apertured circular plug cut from a material similar to said panel, and fit into said opening in said panel whereby said bolt and said circular disc are centered coaxially with respect to said opening in said panel.

20. The method defined in claim 16, wherein said slot is straight and radial from said disc circumference to said bolt hole.

21. The method defined in claim 16 wherein said disc is about equal in diameter to twice the diameter of said hole, less twice the diameter of said bolt, and wherein the diameter of said bolt is less than approximately one-eighth the diameter of said disc.

22. The method defined in claim 16, further comprising:
- a rigid washer having a diameter just slightly smaller than said panel hole, to allow said rigid washer to pass through said hole with close clearance;
- said tension member having a distal end with an enlarged head thereon, and a proximal end for engagement by a tension creating and exerting device;
- said rigid washer having a center hole with a diameter smaller than the diameter of said enlarged head such that the underside of said enlarged heat abuts the top side of said rigid washer, and tension in said tension member created by said tension creating device is converted to compressive stress in said rigid washer, and the compressive stress in said rigid washer is converted to shear stress in said slit disc and thence to compressive pressure against the structure underlying said slit disc.

23. The method defined in claim 16, further comprising:
- allowing said bonding agent to cure;
- removing said nut from said bolt;
- removing said support plate from said bolt; and
- removing the portion of said bolt that protrudes beyond the near surface of said near-side plies.

24. A product produced by the process defined in claim 23.

25. A panel patch for repairing the blind-side of a damaged section of a panel from which the damaged portion has been cut out, leaving a smooth sided hole, comprising:
- a bolt, and a nut for threading on the distal end of said bolt, for exerting a squeezing force on said patch;
- a slit disc having a diameter larger than the diameter of said hole, and a central aperture for insertion onto said bolt, and a slit extending from the outer periphery of said disc to said central aperture, said disc being adapted to be secured and sealed to said panel blind-side on the marginal regions thereof around said hole;
- said slit disc being sufficiently flexible that one edge thereof adjacent said slit may be flexed out of the plane of said disc and inserted through said hole and over the blind-side of said panel on the marginal regions around said hole, and said disc may be turned through said hole from the near-side to the blind-side by revolving said bolt around the periphery of said hole;
- at least one ply of fabric adapted to be inserted on said bolt adjacent said disc, and larger in diameter than said panel hole so that it covers the marginal regions around said panel hole on said panel blind-side, and is urged thereagainst by said slit disc;
- a support plate having a central aperture for receiving the proximal end of said bolt and covering said panel hole and the marginal regions therearound, said nut adapted to bear against said support plate and apply pressure therewith against a plug of fill material filling said hole;
- at least one ply of fabric adapted to be impregnated with a bonding agent and inserted onto said bolt to lie between said panel, on the marginal regions thereof around said panel hole, and be compressed by said support plate against said panel and said fill material to express voids from said near-side ply while said bonding agent cures.

26. The panel patch defined in claim 25, wherein said disc and said blind-side ply is about equal in diameter to twice the diameter of said panel hole, less twice the diameter of said central aperture, and wherein the diameter of said central aperture is less than about one-eighth the diameter of said disc.

27. The panel patch defined in claim 26, further comprising:
- a rigid washer having a diameter just slightly smaller than said panel hole, to allow said rigid washer to pass through said hole with close clearance;
- said tension member having a distal end with an enlarged head thereon, and a proximal end for engagement by a tension creating and exerting device;
- said rigid washer having a central hole with a diameter smaller than the diameter of said enlarged head such that the underside of said enlarged head abuts the top side of said rigid washer, and tension in said tension member created by said tension creating device is converted to compressive stress in said rigid washer, and the compressive stress in said rigid washer is converted to shear stress in said slit disc and thence to compressive pressure against the structure underlying said slit disc.

28. A blind-side repair patch kit for repairing a hole of a certain diameter in a composite material panel having a blind-side to which access is restricted, and a near side which is readily acessible, comprising:
- an elongated tension member having a distal end and a proximal end;
- an enlarged head means on said distal end for transferring tensional stress in said tension member to compressive stress in articles between said head means and the blind-side of said panel;
- means attachable to said proximal end of said tension member for creating and exerting tensile stress in said tension member;
- a circular disc having a central hole slightly larger in diameter than the diameter of said tension member for receiving said tension member, and having a slit extending from the outer periphery of said disc to the central hole thereof, said disc being sufficiently flexible that said disc may be twisted to open said slit so that one edge thereof my be slid through said panel hole and onto the blind disc thereof, and said disc may be rotated through said hole to lie completly on the blind-side of said panel overlying the marginal regions around said hole;
- at least one fabric ply about equal in diameter to said slit disc and adapted to be impregnated with an adhesive and impaled on said tension member between said slit disc and said panel, overlying the marginal regions around said panel hole and pressed thereagainst by said slit disc under pressure from said tension member head means, whereby voids and excess adhesive are squeezed out of said fabric ply and said ply is held firmly pressed against said panel blind-side while said adhesive cures.

29. The blind-side panel repair patch kit defined in claim 28, further comprising:
- a rigid washer having a diameter just slightly smaller than said panel hole, to allow said rigid washer to pass through said hole with close clearance;

said tension member having a distal end with an enlarged head thereon, and a proximal end for engagement by a tension creating and exerting device;

said rigid washer having a center hole with a diameter smaller than the diameter of said enlarged head such that the underside of said enlarged head abuts the top side of said rigid washer, and tension in said tension member created by said tension creating device is converted to compressive stress in said rigid washer, and the compressive stress in said rigid washer is converted to shear stress in said slit disc and thence to compressive pressure against the structure underlying said slit disc.

30. The blind-side panel repair patch kit defined in claim 28, further comprising:

a rigid back-up plate having a central hole about the size of said central hole through said slit disc, but smaller in diameter than the outside diameter of said tension creating means;

whereby said back-up plate may be placed on said tension member on the near side of said panel, with said tension member extending through said back-up plate hole, and said tension creating means may be operated to put said tension member in tension, the reaction of which is borne by said back-up plate operatively bearing against the near side of said panel, such that said panel is squeezed in compression independently of any external support.

31. The blind-side panel repair patch kit defined in claim 30, further comprising:

a circular plug of material about the same thickness as said panel and having a central hole about the same diameter as said slit disc central hole, said plug adapted to slide onto said tension member and lie under said fabric ply to fill said panel hole and center said tension member therein, said plug and said panel hole defining a circular slit therebetween into which said adhesive may be squeezed when said tension member is put in tension, to create a solid plug completely filling said panel hole.

32. The blind-side panel repair patch kit defined in claim 30, further comprising:

a release film for placement between said back-up plate and said panel to enable said back-up plate to be readily removed after said adhesive has cured.

33. The blind-side panel repair patch kit defined in claim 30, further comprising:

at least one other fabric ply adapted to be impregnated with an adhesive and impaled on said tension member between said panel near-side and said back-up plate, such that said near-side fabric ply may be pressed against said panel near-side on the marginal regions around said panel hole, and the voids and excess adhesive may be pressed by said back-up plate out of said near-side fabric ply, and said ply may be pressed firmly against said panel while said adhesive cures.

34. The blind-side panel repair patch kit defined in claim 33, further comprising:

a compliant disc for placement on said tension member between said back-up plate and said other fabric ply for producing a smoothly tapered surface around the peripheral edges of said near-side fabric ply to produce a smoothly tapered external repaired surface on said panel near-side after said adhesive cures.

* * * * *